United States Patent
Murata (10) Patent No.: US 9,970,489 B2
(45) Date of Patent: May 15, 2018

(54) SYNCHRONIZER AND TRANSMISSION

(71) Applicant: HONDA MOTOR CO., LTD., Tokyo (JP)

(72) Inventor: Toshiki Murata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 14/944,361

(22) Filed: Nov. 18, 2015

(65) Prior Publication Data

US 2016/0169298 A1    Jun. 16, 2016

(30) Foreign Application Priority Data

Dec. 11, 2014    (JP) .................. 2014-251044

(51) Int. Cl.
*F16D 23/06*    (2006.01)

(52) U.S. Cl.
CPC .................... *F16D 23/06* (2013.01)

(58) Field of Classification Search
CPC ............ F16D 23/06; F16D 2023/0618; F16D 2023/065; F16D 2023/0681; F16D 23/025
See application file for complete search history.

(56) References Cited

U.S. PATENT DOCUMENTS

| | | | | |
|---|---|---|---|---|
| 4,776,228 A * | 10/1988 | Razzacki | ............... | F16D 23/06 192/53.34 |
| 4,811,825 A * | 3/1989 | Christian | ............... | F16D 23/06 192/53.32 |
| 2005/0061095 A1* | 3/2005 | Yoshino | ................. | F16D 23/06 74/339 |
| 2007/0029155 A1* | 2/2007 | Hiraiwa | ............... | F16D 23/025 192/53.31 |
| 2011/0079482 A1* | 4/2011 | Hiraiwa | ............... | F16D 23/025 192/53.3 |

FOREIGN PATENT DOCUMENTS

JP    3272131 B2    4/2002

* cited by examiner

*Primary Examiner* — Ramya P Burgess
*Assistant Examiner* — Lillian T Nguyen
(74) *Attorney, Agent, or Firm* — Squire Patton Boggs (US) LLP (57) ABSTRACT

A synchronizer comprising: a hub including splines; a sleeve including internal splines; a transmission gear including external splines; a blocking ring including dog teeth, a notch and a preceding projecting member, wherein after the hub and the transmission gear are synchronized, the preceding projecting member is pressed by the internal splines, and engaged with the external splines before the internal splines.

12 Claims, 6 Drawing Sheets

SYNCHRONIZER AND TRANSMISSION

BACKGROUND OF THE INVENTION

Field of the Invention

The present invention relates to a synchronizer.

Description of the Related Art

In a conventional synchronizer such as a gear transmission, when meshing an axially movable sleeve which rotates together with a rotating shaft with external splines of a transmission gear, the two members are synchronously rotated via a blocking ring. In this state, if the circumferential-direction relative positions of a dog teeth of the blocking ring and the external splines of the transmission gear are kept misaligned, the sleeve is sometimes caught by the external splines of the transmission gear, and so-called, two-stage connection may occur.

This two-stage connection gives a driver discomfort in a shift operation, for example, a vibration from the sleeve or unsmoothness of gear shift. Japanese Patent No. 3272131 describes a technique which smoothly engages the sleeve with the external splines by making a distal end chamfered portion of the sleeve or external splines asymmetrical.

In this technique described in Japanese Patent No. 3272131, however, the sleeve directly collides against the external splines depending on the circumferential-direction relative positions of the dog teeth and external splines. This makes it impossible to sufficiently prevent two-stage connection.

SUMMARY OF THE INVENTION

It is, therefore, the present invention provides a preventing two-stage connection caused by misalignment of the relative positions of the dog teeth and external splines.

According to an aspect of the present invention, there is provided a synchronizer comprising: a hub configured to rotate together with a rotating shaft, and including splines on an outer circumferential surface thereof; a sleeve including, on an inner circumferential surface thereof, internal splines to be slidably engaged with the splines, and configured to move in an axial direction between a neutral position and an operation position by a shift operation; a transmission gear adjacent to the hub, relatively rotatably supported by the rotating shaft, having a friction surface on a side of the hub, and including external splines on an outer circumferential surface thereof; a blocking ring arranged between the hub and the transmission gear, including, on an outer circumferential surface thereof, dog teeth to be slidably engaged with the internal splines, and movable in an axial direction so as to be able to frictionally engage with the friction surface; and a synchronous spring attached on the outer circumferential surface of the blocking ring, when the sleeve is moved in the axial direction from the neutral position to the operation position, the blocking ring being moved in the axial direction and frictionally engaged with the transmission gear, and the internal splines of the sleeve being engaged with the dog teeth of the blocking ring, thereby the rotation of the hub being synchronized with the rotation of the transmission gear, and the internal splines moving to the transmission gear and engaging with the external splines, thereby the rotating force of the hub being transmitted to the transmission gear via the sleeve, wherein the blocking ring comprises: a notch formed in the outer circumferential surface thereof; and a preceding projecting member accommodated in the notch, configured to project toward the external splines, and supported by the synchronous spring, and after the rotation of the hub and the rotation of the transmission gear are synchronized by the movement of the sleeve, the preceding projecting member is pressed by the internal splines, and engaged with the external splines before the internal splines are engaged with the external splines.

In this arrangement, the preceding projecting member arranged in the blocking ring engages with the external splines before the internal splines of the sleeve, thereby aligning the circumferential-direction positions of the dog teeth of the blocking ring and the external splines. Consequently, two-stage connection can be prevented.

According to still another aspect of the present invention, there is provided the synchronizer, wherein the preceding projecting member includes an elastic portion, and the preceding projecting member projects toward the external splines when the internal splines press the elastic portion.

In this arrangement, when the preceding projecting member collides against the external splines, the elastic portion buffers the impact of the collision. This makes it possible to reduce the vibration of the impact to be transmitted to the internal splines and sleeve.

According to still another aspect of the present invention, there is provided the synchronizer, wherein the internal splines include, at a distal end, at least one of distal end projections which projects inward in a radial direction, the preceding projecting member includes a preceding chamfered portion connected to the elastic portion and configured to engage with the external splines, the elastic portion configured to be a mountain shape projecting outward in the radial direction and including a pair of inclined surfaces, and when the sleeve passes through the blocking ring, and the distal end projection of the internal splines presses the elastic portion of the preceding projecting member in the axial direction and inward in the radial direction, the preceding chamfered portion projects toward the external splines.

In this arrangement, when the distal end projection of the internal splines abuts against the inclined surface of the elastic portion and presses the elastic portion in the axial direction and inward in the radial direction, the distal end projection and inclined surface move by the frictional force. Accordingly, when the impact of collision of the preceding chamfered portion against the external splines is larger than this frictional force, the distal end projection and inclined surface relatively move. This can further reduce the impact or vibration to be transmitted to the sleeve.

According to still another aspect of the present invention, there is provided the synchronizer, wherein the preceding projecting member further includes a holding hook held by the blocking ring, the holding hook formed by returning a part of the preceding projection member from a lower portion thereof and hooked by the synchronous spring, and the elastic portion is arranged between the holding hook and the preceding chamfered portion.

In this arrangement, the preceding projection can be held by the blocking ring by using the synchronous spring.

According to still another aspect of the present invention, there is provided the synchronizer, wherein the preceding projecting member is movable in the axial direction with respect to the blocking ring.

In this arrangement, when the preceding chamfered portion strongly collides against the external splines, the whole preceding projecting member retreats. This can reduce the collision impact to be transmitted to the sleeve.

According to still another aspect of the present invention, there is provided the synchronizer, wherein the distal end projection includes, at a distal end thereof, a first inclined surface inclining inward in the radial direction, a horizontal surface connected to the first inclined surface, and a second inclined surface connected to the horizontal surface and inclining outward in the radial direction.

In this arrangement, when the elastic portion comes in slidable contact with the first inclined surface and horizontal surface of the distal end projection, the elastic portion is pressed in the axial direction and inward in the radial direction. When the elastic portion comes in slidable contact with the second inclined surface, the elastic portion can be released from this pressing.

According to still another aspect of the present invention, there is provided the synchronizer, wherein the preceding chamfered portion projects toward the external splines at least while the horizontal surface of the distal end projection is pressing the elastic portion, and after the internal splines engage with the external splines, the horizontal surface of the distal end projection releases the elastic portion from pressing, and the preceding chamfered portion returns toward the blocking ring.

In this arrangement, when the elastic portion comes in slidable contact with the second inclined surface of the distal end projection, the elastic portion is released from pressing by the distal end projection. Accordingly, the preceding chamfered portion engaged with the external splines can return toward the blocking ring by the restoring force of the elastic portion.

According to still another aspect of the present invention, there is provided the synchronizer, wherein the notch comprises a plurality of notches arranged at a predetermined interval in the circumferential direction of the blocking ring, and the internal splines include a spline formed in a portion of the sleeve corresponding to the notch and formed smaller than another splines in height.

In this arrangement, when the synchronous spring pressed by the high spline deforms into a projection-and-recess shape in the circumferential direction, a space to which the projection of the deformed synchronous spring escapes can be formed by the low spline.

According to still another aspect of the present invention, there is provided a transmission comprising the synchronizer.

In this arrangement, a transmission which prevents two-stage connection caused by misalignment of the relative positions of the dog teeth and external splines can be provided.

Further features of the present invention will become apparent from the following description of exemplary embodiments (with reference to the attached drawings).

DESCRIPTION OF THE EMBODIMENTS

Figure 1:
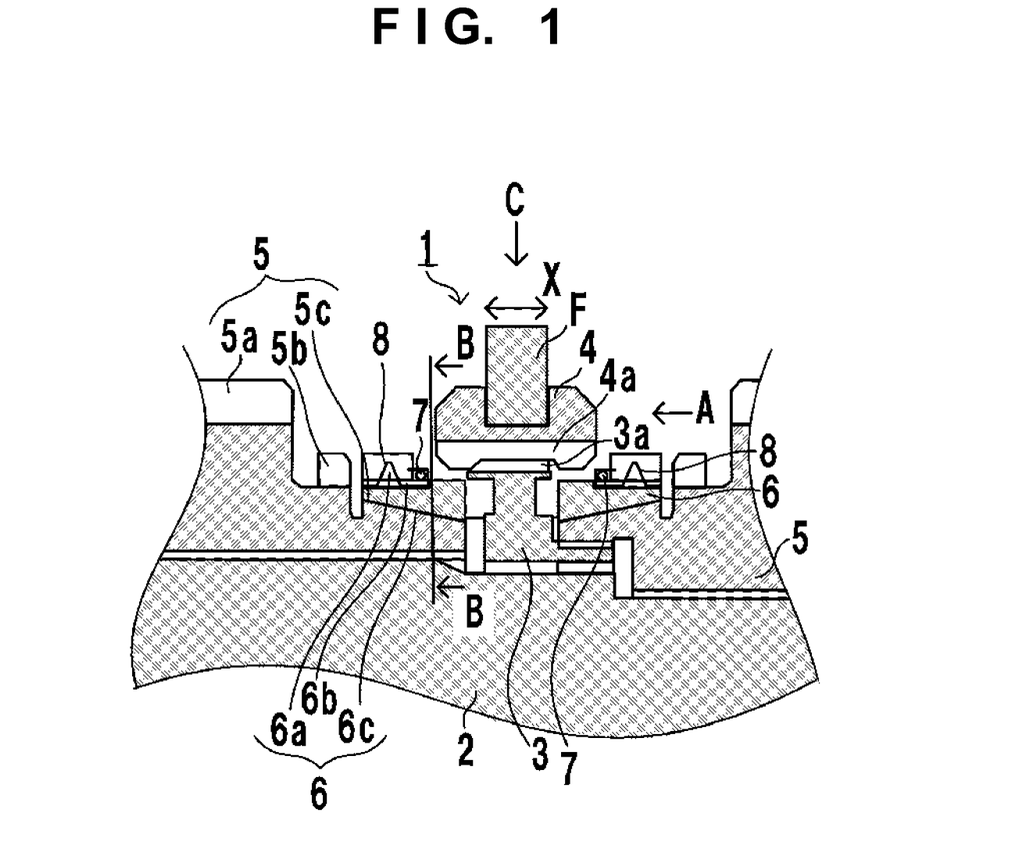
FIG. 1 is a partial sectional view of a synchronizer of a transmission according to an embodiment of the present invention.

FIG. 1 is a sectional view of a synchronizer 1 of a transmission according to an embodiment of the present invention. This embodiment discloses an example in which the synchronizer 1 is applied to a gear transmission to be mounted in a vehicle. In the following explanation, the vertical and horizontal directions of each drawing are used as the vertical and horizontal directions of the synchronizer 1.

<Synchronizer 1>

The synchronizer 1 includes a rotating shaft 2, a hub 3, a sleeve 4, transmission gears 5, a blocking ring 6, a synchronous spring 7, and preceding projecting members 8. The rotating shaft 2 is connected to a driving source (not shown) and rotated by a rotational driving force from the driving source. The hub 3 is an annular member. The rotating shaft 2 is inserted into the inner circumferential surface of the hub 3, and the hub 3 is rotated together with the rotating shaft 2. The hub 3 has a spline 3a on the outer circumferential surface. The spline 3a formed on the outer circumferential surface of the hub 3 slidably engages with an internal spline 4a of the sleeve 4 (to be described below).

Figure 2A:
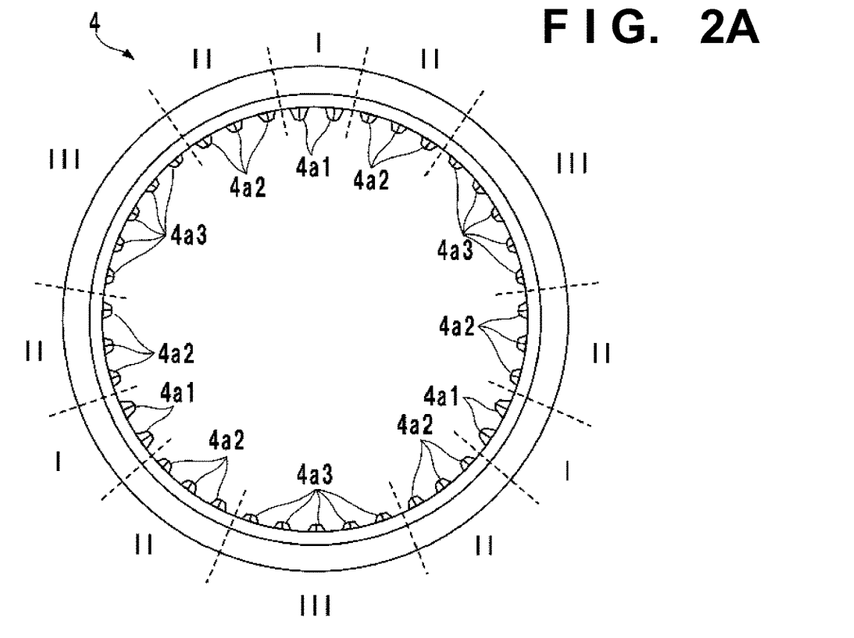
FIG. 2A is a plan view of a sleeve.

The sleeve 4 is an annular member, and a portion F of a shift fork (not shown) is engaged with a groove formed in the outer circumferential surface and extending in the circumferential direction. When driven by a driver's shift operation, the sleeve 4 moves in the axial direction (the direction of an arrow X in FIG. 1) between a neutral position and an operation position. The sleeve 4 has the internal spline 4a on the inner circumferential surface. The internal spline 4a is slidably engaged with the spline 3a of the hub 3. Note that in FIG. 1, the sleeve 4 is arranged in the neutral position, and moves between the neutral position and the operation position by moving in the horizontal direction indicated by the arrow X in FIG. 1. FIG. 2A is a plan view showing the sleeve 4 in FIG. 1 in the direction of an arrow A.

A pair of transmission gears 5 are arranged adjacent to and on the left and right sides of the hub 3. The explanation will be made by taking the transmission gear 5 arranged on the left side of FIG. 1 as an example, but the transmission gear 5 arranged on the right side can have the same arrangement. The inner circumferential surface of the transmission gear 5 is supported by the rotating shaft 2 via a bearing (not shown) or the like, so that the transmission gear 5 can relatively rotate. Also, the outer circumferential surface of the transmission gear 5 includes a tooth 5a which meshes with a gear of a counter shaft (not shown), and an external spline 5b which engages with the internal spline 4a of the sleeve 4.

Furthermore, the outer circumferential surface of the transmission gear 5 includes an outer-circumference friction surface 5c which frictionally engages with an inner-circumference friction surface 6c of the blocking ring 6 (to be described later). The external spline 5b is arranged between the tooth 5a and the outer-circumference friction surface 5c, and engages with the internal spline 4a of the sleeve 4, thereby transmitting the rotational driving force of the rotating shaft 2 to the transmission gear 5 via the hub 3 and sleeve 4. Also, the outer-circumference friction surface 5c has a tapered surface arranged on the inner circumferential surface side of the blocking ring 6, and inclining inward toward the hub 3.

The blocking ring 6 is a power transmission path, and arranged between the hub 3 and the transmission gear 5. The outer circumferential surface of the blocking ring 6 includes a dog tooth 6a to be slidably engaged with the internal spline 4a, and a notch 6b for accommodating the preceding projecting member 8 (to be described later). A plurality of notches 6b are formed in the circumferential direction of the blocking ring 6. Note that in this embodiment, three notches 6b are formed in the outer circumferential surface of the blocking ring 6 in order to accommodate three preceding projecting members 8. The inner circumferential surface of the blocking ring 6 has the inner-circumference friction surface 6c which is a tapered surface inclining inward toward the hub 3, and can frictionally engage with the outer-circumference friction surface 5c of the transmission gear 5. Note that the blocking ring 6 can move in the axial direction with respect to the transmission gear 5, and is moved in the axial direction by the sleeve 4.

Figure 2B:
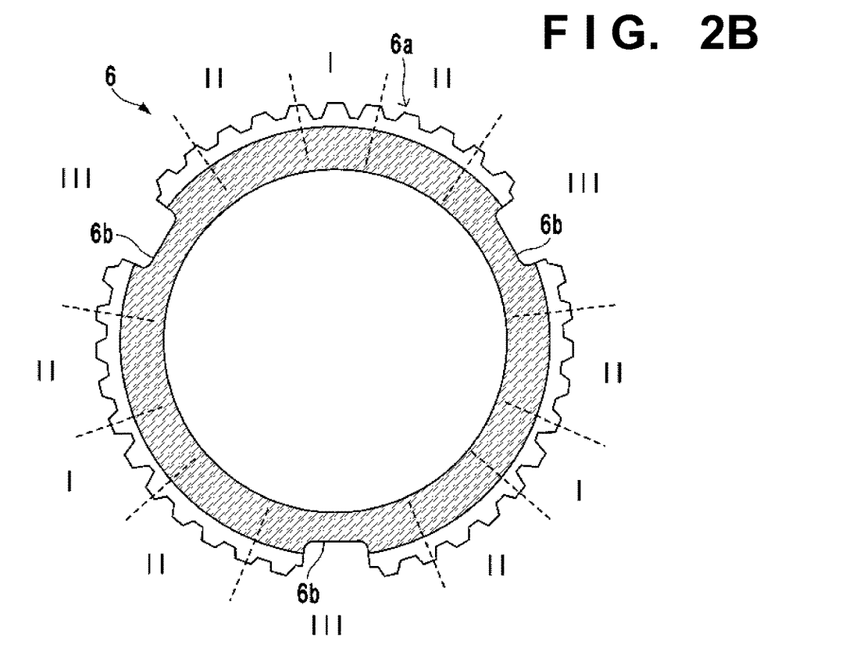
FIG. 2B is a plan view of a blocking ring.

When the blocking ring 6 moves toward the transmission gear 5, the tapered surface of the outer-circumference friction surface 5c of the transmission gear 5 and the tapered surface of the inner-circumference friction surface 6c of the blocking ring 6 come into contact with each other. Accordingly, even when the blocking ring 6 and transmission gear 5 relatively rotate, the inner-circumference friction surface 6c and outer-circumference friction surface 5c frictionally engage with each other, thereby frictionally fastening the blocking ring 6 and transmission gear 5 in synchronism with each other. FIG. 2B is a sectional view of the blocking ring 6 taken along a line B-B in FIG. 1.

The synchronous spring 7 is attached on the outer circumferential surface of the blocking ring 6, and arranged on the side of the sleeve 4 adjacent to the dog tooth 6a. When pressed against a portion of the internal spline 4a (to be described later), the synchronous spring 7 encourages frictional engagement between the blocking ring 6 and the transmission gear 5. An example of the synchronous spring 7 is an annular member, but the synchronous spring 7 is not limited to this, and it is also possible to adopt, for example, a partially notched C-shaped annular member.

The sleeve 4 and blocking ring 6 will be explained in detail below with reference to FIGS. 2A and 2B. FIG. 2A is a plan view showing the sleeve 4 in the direction of the arrow A in FIG. 1. On the inner circumferential surface of the sleeve 4, three types of internal splines 4a different in height are arranged such that spline sets each having a predetermined number of splines are arranged at equal intervals. FIG. 2A shows a set of internal splines 4a1 having the largest height as region I, and two internal splines 4a1 form one set in region I. FIG. 2A also shows a set of internal splines 4a3 having the smallest height as region III, and five internal splines 4a3 form one set in region III.

In addition, FIG. 2A shows, as region II, a set of internal splines 4a2 having a height intermediate between those of the abovementioned two types of internal splines 4a1 and 4a3, and three internal splines 4a2 form one set in region II. Referring to FIG. 2A, three regions I are arranged at an interval of 120° in the circumferential direction of the sleeve 4. Regions II are arranged on the two sides of each region I, and six regions II are arranged at a given interval in the circumferential direction of the sleeve 4. Three regions III are arranged at an interval of 120° in the circumferential direction of the sleeve 4 so that each region III is sandwiched between two regions II.

The height of the internal spline 4a1 in region I is set at a height by which when pressing the aforementioned synchronous spring 7, the internal spline 4a1 can strongly press the synchronous spring 7 inward in the radial direction. The height of the internal spline 4a2 in region II is set at a height by which when the sleeve 4 moves over the synchronous spring 7, the internal spline 4a2 can abut against the synchronous spring 7. The height of the internal spline 4a3 in region III is set at a height by which when the sleeve 4 passes over the synchronous spring 7, the internal spline 4a3 does not come in contact with the synchronous spring 7. In this arrangement, when the synchronous spring 7 pressed by the internal splines 4a1 arranged in the three portions of the sleeve 4 in the circumferential direction is deformed into a projection-and-recess shape (for example, a moderate triangular shape) in the circumferential direction, a portion to which a projection (for example, the summit of the moderate triangular shape) of the deformed synchronous spring 7 escapes is formed in the space between the internal spline 4a3 in region III and the blocking ring 6.

FIG. 2B is a sectional view of the blocking ring 6 taken along the line B-B in FIG. 1. A plurality of dog teeth 6a are formed on the outer circumferential surface of the blocking ring 6, and recesses each capable of accommodating the internal spline 4a of the sleeve 4 shown in FIG. 2A are each formed between a pair of dog teeth 6a. These recesses have depths corresponding to the heights of the teeth of the internal splines 4a in regions I, II, and III of the sleeve 4 described above. Accordingly, abovementioned regions I, II, and III corresponding to the recesses different in depth are formed on the outer circumferential surface of the blocking ring 6 as well.

As shown in FIG. 2B, on the outer circumferential surface of the blocking ring 6, three regions I are arranged at an interval of 120° in the circumferential direction, regions II are arranged adjacent to regions I, and regions III are arranged adjacent to regions II. In regions III, the plurality of notches 6b capable of accommodating the preceding projecting members 8 are arranged at a predetermined interval in the circumferential direction of the blocking ring 6. In this embodiment, three notches 6b are arranged at an interval of 120° in the circumferential direction. Accordingly, the internal splines 4a3 in region III of the sleeve 4 are arranged in positions corresponding to the notches 6b, and the internal splines 4a3 are lower than other splines as described previously, thereby forming a space to which the synchronous spring 7 deformed between the sleeve 4 and the blocking ring 6 escapes.

<Preceding Projecting Member 8>

Figure 3:
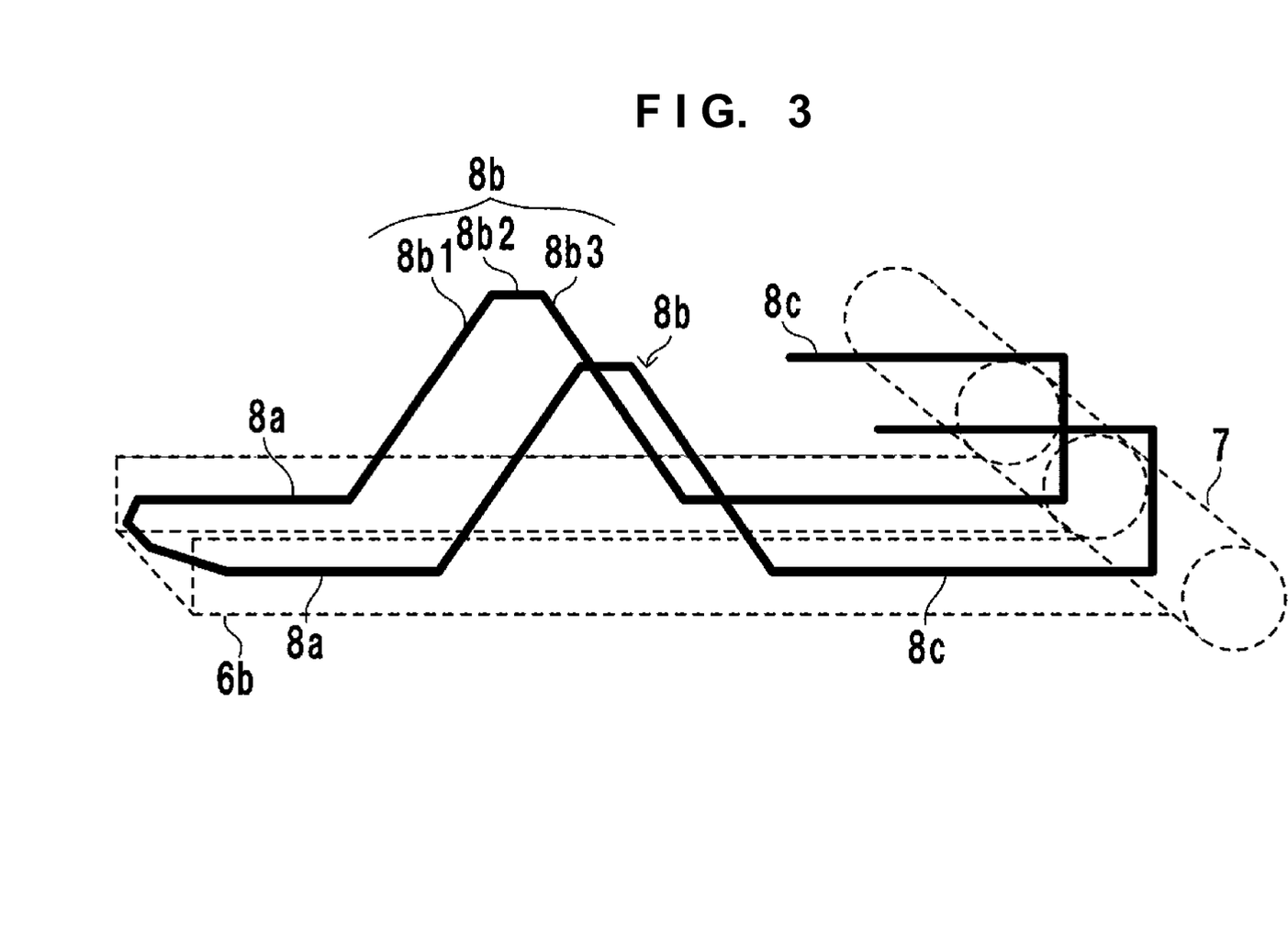
FIG. 3 is a perspective view of a preceding projecting member.

The preceding projecting member 8 will be explained below with reference to FIGS. 1 and 3. The preceding projecting member 8 is accommodated in the notch 6b of the blocking ring 6, can project toward the external spline 5b, and is supported by the synchronous spring 7. FIG. 3 is a perspective view of the preceding projecting member 8. The preceding projecting member 8 includes a preceding chamfered portion 8a, elastic portion 8b, and holding hook 8c. The elastic portion 8b is arranged between the preceding chamfered portion 8a and the holding hook 8c. The holding hook 8c engages with the synchronous spring 7. In the notch 6b of the blocking ring 6, therefore, the preceding projecting member 8 is arranged such that the preceding chamfered portion 8a faces the external spline 5b.

When pressed by the internal spline 4a (to be described later), the distal end portion (the left end portion in FIG. 3) of the preceding chamfered portion 8a engages with the external spline 5b before the internal spline 4a. The proximal end portion (the right end portion in FIG. 3) of the preceding chamfered portion 8*a* is connected to the elastic portion 8*b*. The elastic portion 8*b* is formed into a mountain shape including a pair of inclined side portions 8*b*1 and 8*b*3 projecting outward in the radial direction, and a horizontal portion 8*b*2 arranged between them. Note that the elastic portion 8*b* having a trapezoidal shape in a side view including the horizontal portion will be explained below in this embodiment, but it is also possible to adopt an elastic portion having a triangular shape in a side view including no horizontal portion.

Details of the elastic portion 8*b* having the trapezoidal shape in a side view are as follows. The first inclined side portion 8*b*1 connected to the preceding chamfered portion 8*a* extends outward in the radial direction from the preceding chamfered portion 8*a* while inclining at a predetermined angle with respect to the horizontal plane. The horizontal portion 8*b*2 extending horizontally is connected to the end portion of the first inclined side portion 8*b*1, which is opposite to the end portion connected to the preceding chamfered portion 8*a*. The second inclined side portion 8*b*3 is connected to the end portion of the horizontal portion 8*b*2, which is opposite to the end portion connected to the first inclined end portion 8*b*1. The second inclined side portion 8*b*3 extends inward in the radial direction from the horizontal portion 8*b*2 while inclining at a predetermined angle with respect to the horizontal plane. The second inclined side portion 8*b*3 is connected to the holding hook 8*c* (to be described later). As described above, the elastic portion 8*b* includes the horizontal portion 8*b*2 between the pair of inclined side portions 8*b*1 and 8*b*3, and entirely bends and elastically deforms when a distal end projection 4*a*A of the internal spline 4*a* (to be described later) presses the pair of inclined side portions 8*b*1 and 8*b*3. The holding hook 8*c* has a C-shape in a side view by returning from below the preceding projecting member 8, thereby having a returning shape which is hooked by the synchronous spring 7. Since the holding hook 8*c* is hooked by the synchronous spring 7, the preceding projecting member 8 is held by the blocking ring 6.

In this embodiment, as shown in FIG. 3, the preceding projecting member 8 is formed by a wire material or the like. That is, a pair of wire materials each including the preceding chamfered portion 8*a*, elastic portion 8*b*, and holding hook 8*c* are prepared, and the preceding chamfered portions 8*a* of these wire materials are connected to be narrowed. However, the present invention is not limited to this, and it is also possible to adopt a plate member instead of the wire material. In addition, it is possible to use an elastic material as the elastic portion 8*b*, and a material different from the elastic portion 8*b* as the preceding chamfered portion 8*a* and holding hook 8*c*.

<Operation of Preceding Projecting Member 8>

Figure 4:
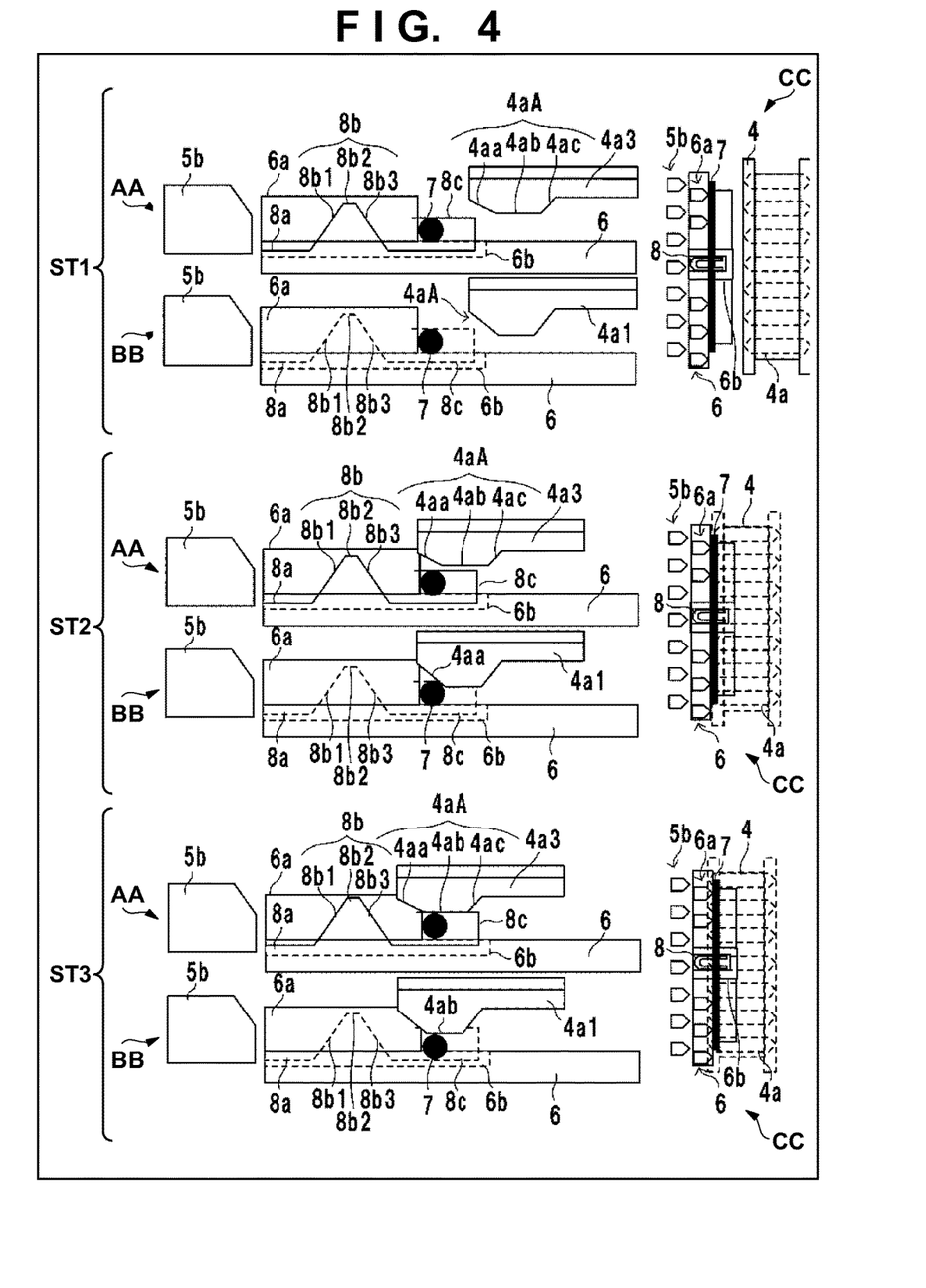
FIG. 4 is a view for explaining the operation of the synchronizer.

The operation of the preceding projecting member 8 when the synchronizer 1 is in operation will be explained with reference to FIGS. 4, 5, and 6. For example, ST1 in FIG. 4 shows a state in which the sleeve 4 is in the neutral position, and the internal splines 4*a* are not in contact with the blocking ring 6. AA is a partially enlarged view of the dog tooth 6*a*, the notch 6*b* of the blocking ring 6, the preceding projecting member 8, the synchronous spring 7, and the internal spline 4*a*3 having the smallest height in region III shown in FIG. 2A. BB is a partially enlarged view of the dog tooth 6*a*, the blocking ring 6, the synchronous spring 7, and the internal spline 4*a*1 having the largest height in region I shown in FIG. 2A.

Also, to facilitate understanding the operation of the synchronizer 1, the preceding projecting member 8 and notch 6*b* shown in AA are indicated by the broken lines in BB. CC is a plan view taken along the direction of an arrow C in FIG. 1, and shows the way the sleeve 4 moves with respect to the blocking ring 6. CC shows the sleeve 4 by the broken lines. Note that some arrangements are simplified for the sake of explanation in AA, BB, and CC. Furthermore, the individual members are the same in FIGS. 5 and 6.

In this embodiment, the internal spline 4*a* of the sleeve 4 will be explained in detail. For example, the explanation will be made by using the internal spline 4*a*3 in region III shown in ST1 of FIG. 4. The internal spline 4*a* of the sleeve 4 includes the distal end projection 4*a*A which projects inward in the radial direction, at the distal end of each of the two end portions in the axial direction. The distal end projection 4*a*A includes a first inclined surface 4*aa* formed at the distal end and inclining inward in the radial direction at a predetermined angle with respect to the horizontal plane, a horizontal surface 4*ab* connected to the first inclined surface 4*aa*, and a second inclined surface 4*ac* connected to the horizontal surface 4*ab* and inclining outward in the radial direction at a predetermined angle with respect to the horizontal surface 4*ab*. Note that in this embodiment, the example in which the distal end projections 4*a*A are formed in the two end portions of the internal spline 4*a* in the axial direction is disclosed. However, if the blocking ring 6, transmission gear 5, and the like are not arranged in one end portion of the internal spline 4*a* in the axial direction, the distal end projection 4*a*A need not be formed in this end portion. The aforementioned individual members are the same in FIGS. 5 and 6.

The operation of the synchronizer 1 will now be explained. When the synchronizer 1 starts synchronization from the state shown in ST1 of FIG. 4, the sleeve 4 is first moved in the axial direction (leftward in FIG. 4) from the neutral position to the operation position by, for example, a shift operation. Consequently, as shown in ST2 of FIG. 4, the sleeve 4 and the internal splines 4*a* formed on the sleeve 4 move to the operation position (leftward in FIG. 4). In this state shown in ST2, the first inclined surface 4*aa* of the internal spline 4*a*1 in region I shown in BB abuts against the synchronous spring 7. In this state, the blocking ring 6 is slightly moved toward the transmission gear 5, and the inner-circumference friction surface 6*c* of the blocking ring 6 and the outer-circumference friction surface 5*c* of the transmission gear 5 mentioned earlier come in contact with each other and start rotating in synchronism with each other.

ST3 shows a state in which the sleeve 4 is further moved from the state shown in ST2. In this state shown in ST3, the internal splines 4*a* start engaging with the dog teeth 6*a* of the blocking ring 6. In addition, in the state shown in ST3, the horizontal surface 4*ab* of the internal spline 4*a*1 in region I strongly presses the synchronous spring 7 inward in the radial direction, as indicated by BB. Since the synchronous spring 7 is strongly pressed inward in the radial direction, the blocking ring 6 and transmission gear 5 further synchronously rotate. In this state, the synchronous spring 7 pressed and deformed by the internal spline 4*a*1 in region I floats from the outer circumferential surface of the blocking ring 6 and abuts against the horizontal surface 4*ab* of the internal spline 4*a*3 in region III shown in AA. The horizontal surface 4*ab* of the internal spline 4*a*3 thus forms a space to which the synchronous spring 7 deformed between the sleeve 4 and the blocking ring 6 escapes.

Figure 5:
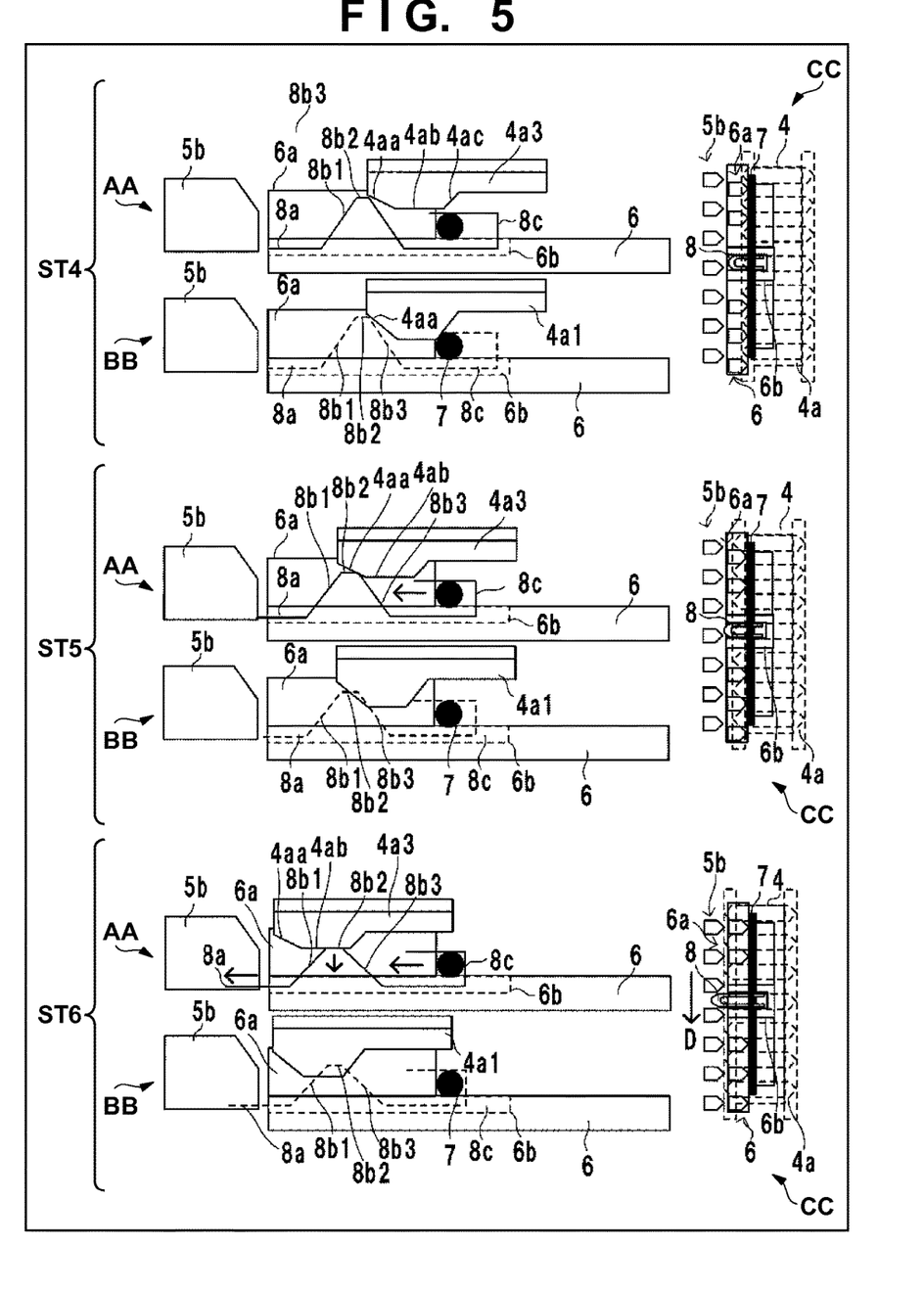
FIG. 5 is a view for explaining the operation of the synchronizer.

ST4 in FIG. 5 shows a state in which the sleeve 4 is further moved from the state shown in ST3. In this state shown in ST4 of FIG. 5, the internal spline 4a3 in region III starts abutting against the elastic portion 8b of the preceding projecting member 8 as indicated by AA. In this state, the horizontal surface 4ab of the internal spline 4a1 in region I stops pressing the synchronous spring 7, and the second inclined surface 4ac and synchronous spring 7 are in contact with each other, as indicated by BB.

ST5 shows a state in which the sleeve 4 is further moved to the left in FIG. 5 from the state shown in ST4. In this state shown in ST5, as indicated by AA, the first inclined surface 4aa of the internal spline 4a3 in region III presses the elastic portion 8b of the preceding projecting member 8 presses the second inclined side portion 8b3 of the elastic portion 8b of the preceding projecting member 8, so the whole preceding projecting member 8 moves to the left in FIG. 5. In this state, the whole preceding projecting member 8 moves by a predetermined amount and the movement is regulated after that because the synchronous spring 7 abuts against the holding hook 8c of the preceding projecting member 8. Furthermore, the first inclined surface 4aa of the internal spline 4a3 presses the horizontal portion 8b2 of the elastic portion 8b of the preceding projecting member 8 inward in the radial direction, so the whole elastic portion 8b bends inward in the radial direction. In this state, as indicated by CC, the preceding chamfered portion 8a connected to the elastic portion 8b starts projecting toward the external spline 5b.

ST6 shows a state in which the sleeve 4 is further moved from the state shown in ST5. In this state shown in ST6, the horizontal surface 4ab of the internal spline 4a3 in region III and the horizontal portion 8b2 of the elastic portion 8b are in slidable contact with each other, as indicated by AA. In this state, the elastic portion 8b is pressed inward most in the radial direction by the internal spline 4a3. As indicated by CC, therefore, the preceding chamfered portion 8a of the preceding projecting member 8 engages with the outer spline.

If the circumferential-direction positions of the external splines 5b and dog teeth 6a are not aligned in the axial direction as in, for example, the state indicated by CC in ST5, the projecting preceding chamfered portion 8a pushes aside and penetrates between a plurality of external splines 5b. Consequently, as indicated by the direction of an arrow D in CC of ST6, the external splines 5b of the transmission gear 5 move downward in the drawing. When the preceding projecting member 8 thus projects, the external splines 5b of the transmission gear 5 and the dog teeth 6a of the blocking ring 6 are aligned in the axial direction. Note that in this state, the internal splines 4a of the sleeve 4 engage with the dog teeth 6a but have not engaged yet with the outer splines.

Figure 6:
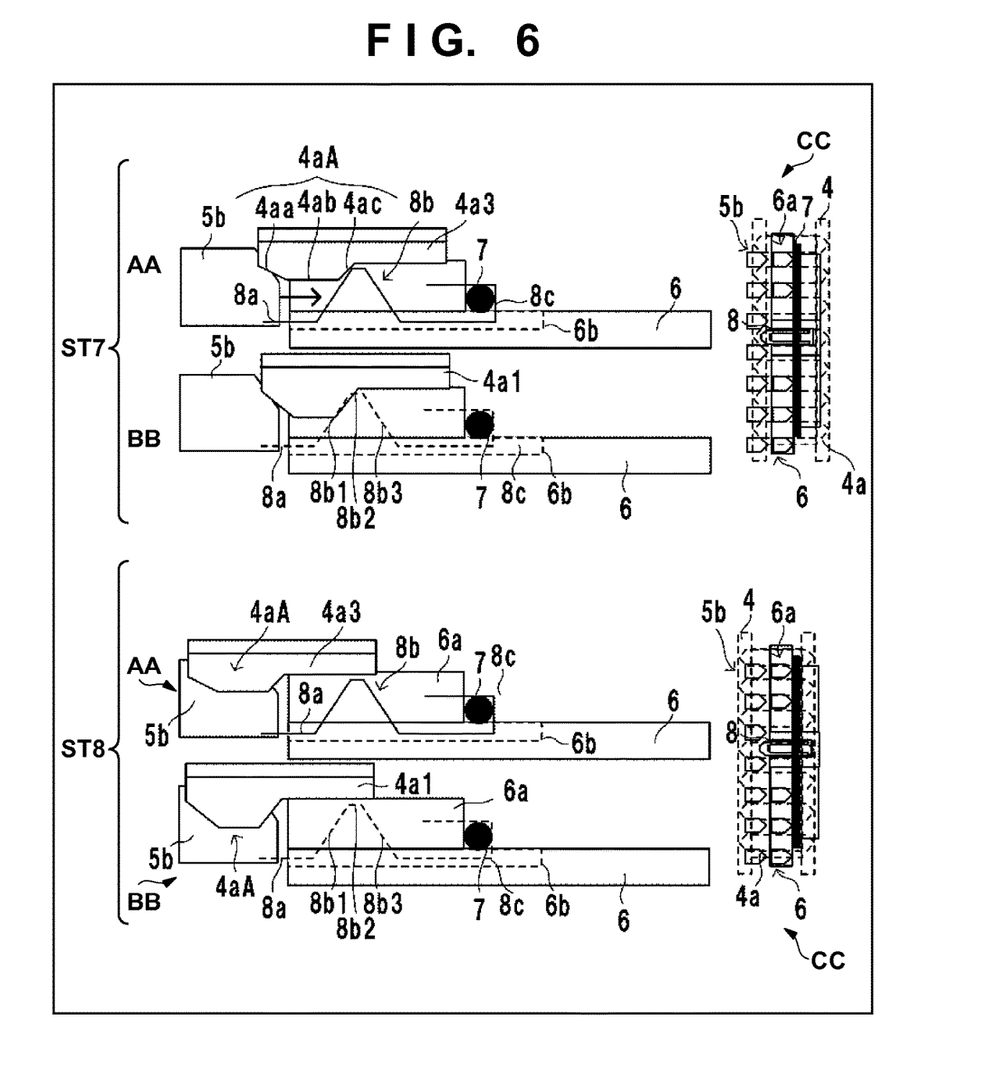
FIG. 6 is a view for explaining the operation of the synchronizer.

ST7 in FIG. 6 shows a state in which the sleeve 4 is further moved from the state shown in ST6. In this state shown in ST7 of FIG. 6, the internal spline 4a3 in region III stops pressing the elastic portion 8b of the preceding projecting member 8, and starts engaging with the external spline 5b, as indicated by AA. The elastic portion 8b released from pressing by the internal spline 4a3 returns to the original state (the state before ST4 in FIG. 5) which is before the elastic portion 8b is crushed by the horizontal surface 4ab of the internal spline 4a3, and in which the elastic portion 8b projects outward in the radial direction. Then, the restoring force of the elastic portion 8b returns the preceding chamfered portion 8a toward the blocking ring.

ST8 shows a state in which the sleeve 4 is further moved from the state shown in ST7. In this state shown in ST8, both the internal spline 4a3 in region III and the internal spline 4a1 in region I are engaged with the external splines 5b, as indicated by AA and BB. This completes the operation of the synchronizer 1 by which the internal splines 4a move to the transmission gear 5 and engage with the external splines 5b, thereby transmitting the rotating force between the hub 3 and the transmission gear 5 via the sleeve 4.

Note that the whole preceding projecting member 8 is kept moved to the left side in FIG. 6. When returning the sleeve 4 to the neutral position (when moving the sleeve 4 rightward in FIG. 6), however, the preceding projecting member 8 moves because the second inclined surface 4ac of the internal spline 4a pushes the first inclined side portion 8b1 of the elastic portion 8b. For example, the preceding projecting member 8 can move to the position shown in ST1 of FIG. 4, and to the right side in the drawing. Accordingly, when, for example, the internal spline 4a presses the elastic portion 8b of the preceding projecting member 8 and the distal end of the preceding chamfered portion 8a collides against the distal end portion of the external spline 5b, the whole preceding projecting member 8 moves in the axial direction because the whole preceding projecting member 8 can move with respect to the blocking ring 6. This reduces the vibration of the collision to be transmitted to the sleeve 4.

In the synchronizer 1 according to this embodiment as described above, the preceding projecting members 8 arranged in the blocking ring 6 engage with the external splines 5b before the internal splines 4a of the sleeve 4, so the circumferential-direction positions of the dog teeth 6a of the blocking ring 6 and the external splines 5b are aligned. This makes it possible to prevent two-stage connection. When the preceding projecting member 8 collides against the external spline 5b, the elastic portion 8b buffers the impact of the collision. Accordingly, it is possible to reduce the vibration of the impact to be transmitted to the internal splines 4a and sleeve 4.

Also, when the distal end projection 4aA of the internal spline 4a abuts against the inclined surface of the elastic portion 8b and presses the elastic portion 8b in the axial direction and inward in the radial direction, the distal end projection 4aA and inclined surface move by the frictional force. Therefore, when the impact of collision of the preceding chamfered portion 8a against the outer spline 5b is larger than this frictional force, the distal end projection 4aA and inclined surface relatively move. This can further reduce the impact and vibration to be transmitted to the sleeve. The preceding projecting member can be held by the blocking ring 6 by using the synchronous spring 7.

Furthermore, when the preceding chamfered portion 8a strongly collides against the external spline 5b, the whole preceding projecting member 8 retreats. This can reduce the impact of the collision to be transmitted to the sleeve 4. The elastic portion 8b is pressed inward in the radial direction when brought into slidable contact with the first inclined surface 4aa and horizontal surface 4ab of the distal end projection 4aA, and is released from this pressing when brought into slidable contact with the second inclined surface 4ac. Since the elastic portion 8b is released from pressing by the distal end projection 4aA when brought into slidable contact with the second inclined surface 4ac of the distal end projection 4aA, the preceding chamfered portion 8a engaged with the external spline 5b can return toward the blocking ring 6 by the restoring force of the elastic portion 8b. When the synchronous spring 7 pressed by the internal spline 4a1 having a large height is deformed into a projection-and-recess shape in the circumferential direction, a space to which the projection can escape can be formed by the internal spline 4a3 having a small height.

In this embodiment, the example in which the synchronizer 1 is applied to a gear transmission to be mounted in a vehicle has been disclosed. However, the present invention is not limited to this. The synchronizer 1 can also be used in another power transmitting apparatus, for example, a power transmitting apparatus of a screw of a ship, or a power transmitting apparatus of a machine tool, conveyance machine, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-251044, filed Dec. 11, 2014 which is hereby incorporated by reference herein in its entirety.

What is claimed is:

1. A synchronizer comprising:
a hub configured to rotate together with a rotating shaft, and including a first outer circumferential surface and first external splines on the first outer circumferential surface;
a sleeve including, on an inner circumferential surface thereof, internal splines to be slidably engaged with the first external splines, and configured to move in an axial direction between a neutral position and an operation position by a shift operation;
a transmission gear adjacent to the hub, relatively rotatably supported by the rotating shaft, having a friction surface on a side of the hub, and including a second outer circumferential surface and second external splines on the second outer circumferential surface;
a blocking ring arranged between the hub and the transmission gear, including a third outer circumferential surface and dog teeth on the third outer circumferential surface to be slidably engaged with the internal splines, and movable in an axial direction so as to be able to frictionally engage with the friction surface; and
a synchronous spring attached on the third outer circumferential surface of the blocking ring,
when the sleeve is moved in the axial direction from the neutral position to the operation position, the blocking ring being moved in the axial direction and frictionally engaged with the transmission gear, and the internal splines of the sleeve being engaged with the dog teeth of the blocking ring, thereby the rotation of the hub being synchronized with the rotation of the transmission gear, and
the internal splines moving to the transmission gear and engaging with the second external splines, thereby the rotating force of the hub being transmitted to the transmission gear via the sleeve,
wherein the blocking ring comprises:
a notch formed in the third outer circumferential surface; and
a preceding projecting member accommodated in the notch, configured to project toward the second external splines, and supported by the synchronous spring, and
after the rotation of the hub and the rotation of the transmission gear are synchronized by the movement of the sleeve, the preceding projecting member is pressed by the internal splines, and engaged with the second external splines before the internal splines are engaged with the second external splines.

2. The synchronizer according to claim 1, wherein
the preceding projecting member includes an elastic portion, and
the preceding projecting member projects toward the second external splines when the internal splines press the elastic portion.

3. The synchronizer according to claim 2, wherein
the internal splines include, at a distal end, at least one of distal end projections which projects inward in a radial direction,
the preceding projecting member includes a preceding chamfered portion connected to the elastic portion and configured to engage with the second external splines,
the elastic portion configured to be a mountain shape projecting outward in the radial direction and including a pair of inclined surfaces, and
when the sleeve passes through the blocking ring, and the distal end projection of the internal splines presses the elastic portion of the preceding projecting member in the axial direction and inward in the radial direction, the preceding chamfered portion projects toward the second external splines.

4. The synchronizer according to claim 3, wherein
the preceding projecting member further includes a holding hook held by the blocking ring, the holding hook formed by returning a part of the preceding projection member from a lower portion thereof and hooked by the synchronous spring, and
the elastic portion is arranged between the holding hook and the preceding chamfered portion.

5. The synchronizer according to claim 4, wherein the preceding projecting member is movable in the axial direction with respect to the blocking ring.

6. The synchronizer according to claim 3, wherein the preceding projecting member is movable in the axial direction with respect to the blocking ring.

7. The synchronizer according to claim 3, wherein the distal end projection includes, at a distal end thereof, a first inclined surface inclining inward in the radial direction, a horizontal surface connected to the first inclined surface, and a second inclined surface connected to the horizontal surface and inclining outward in the radial direction.

8. The synchronizer according to claim 7, wherein
the preceding chamfered portion projects toward the second external splines at least while the horizontal surface of the distal end projection is pressing the elastic portion, and
after the internal splines engage with the second external splines, the horizontal surface of the distal end projection releases the elastic portion from pressing, and the preceding chamfered portion returns toward the blocking ring.

9. The synchronizer according to claim 2, wherein the preceding projecting member is movable in the axial direction with respect to the blocking ring.

10. The synchronizer according to claim 1, wherein the preceding projecting member is movable in the axial direction with respect to the blocking ring.

11. The synchronizer according to claim 1, wherein
the notch comprises a plurality of notches arranged at a predetermined interval in a circumferential direction of the blocking ring, and
the internal splines include a spline formed in a portion of the sleeve corresponding to the notch and formed smaller than another splines in height.

12. A transmission comprising a synchronizer cited in claim 1.

* * * * *